United States Patent
Rho et al.

(10) Patent No.: US 9,658,507 B2
(45) Date of Patent: May 23, 2017

(54) LIQUID CRYSTAL DISPLAY DEVICE

(71) Applicant: Samsung Display Co., Ltd., Yongin (KR)

(72) Inventors: Soon Joon Rho, Suwon-si (KR); Kyungmin Kim, Seoul (KR); Jin-Lak Kim, Osan-si (KR); Hyelim Jang, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/519,763

(22) Filed: Oct. 21, 2014

(65) Prior Publication Data

US 2015/0322341 A1    Nov. 12, 2015

(30) Foreign Application Priority Data

May 9, 2014 (KR) .................. 10-2014-0055576

(51) Int. Cl.
*G02F 1/137* (2006.01)
*C09K 19/02* (2006.01)
(Continued)

(52) U.S. Cl.
CPC .............. *G02F 1/137* (2013.01); *C09K 19/02* (2013.01); *C09K 19/12* (2013.01);
(Continued)

(58) Field of Classification Search
CPC ... G02F 1/137; G02F 1/134309; C09K 19/02; C09K 19/12; C09K 19/3001;
(Continued)

(56) References Cited

U.S. PATENT DOCUMENTS 5,126,868 A * 6/1992 Kizaki ................ G02F 1/13471
349/180
2003/0201966 A1* 10/2003 Pan ...................... G02F 1/13306
345/101

(Continued)

FOREIGN PATENT DOCUMENTS

| KR | 101100992 | 12/2011 |
|----|-----------|---------|
| KR | 1020130026516 | 3/2013 |
| KR | 1020130050625 | 5/2013 |

OTHER PUBLICATIONS

Wu, et al., "Optimal Operation Temperature of Liquid Crystal Modulators", Applied Optics, Aug. 15, 1987, vol. 26, No. 16, pp. 3441-3445.

(Continued)

*Primary Examiner* — Shean C Wu
*Assistant Examiner* — Anna Malloy
(74) *Attorney, Agent, or Firm* — H.C. Park & Associates, PLC (57) ABSTRACT

A liquid crystal display device includes a first substrate, a second substrate facing the first substrate, and a liquid crystal layer interposed between the first substrate and the second substrate. The liquid crystal layer includes liquid crystal molecules having a negative dielectric anisotropy, a response speed of about 4.0 ms or less, and a rotational viscosity of about 47 mPa·S to about 75 mPa·S.

9 Claims, 5 Drawing Sheets

(51) Int. Cl.
*C09K 19/12* (2006.01)
*C09K 19/30* (2006.01)
*G02F 1/1333* (2006.01)
*G02F 1/1343* (2006.01)
*G02F 1/1337* (2006.01)

(52) U.S. Cl.
CPC ...... *C09K 19/3001* (2013.01); *C09K 19/3003* (2013.01); *C09K 19/3028* (2013.01); *G02F 1/133345* (2013.01); *G02F 1/134309* (2013.01); *C09K 2019/123* (2013.01); *C09K 2019/301* (2013.01); *C09K 2019/3004* (2013.01); *C09K 2019/3009* (2013.01); *C09K 2019/3016* (2013.01); *C09K 2019/3027* (2013.01); *G02F 1/133703* (2013.01); *G02F 2001/13712* (2013.01)

(58) Field of Classification Search
CPC ............ C09K 19/3003; C09K 19/3028; C09K 2019/123; C09K 2019/3004; C09K 2019/301; C09K 2019/3027
See application file for complete search history.

(56) References Cited

U.S. PATENT DOCUMENTS

| | | | |
|---|---|---|---|
| 2004/0036834 A1* | 2/2004 | Ohnishi et al. | 349/177 |
| 2008/0117379 A1* | 5/2008 | Kim et al. | 349/167 |
| 2009/0213318 A1 | 8/2009 | Klasen-Memmer et al. | |
| 2010/0214517 A1* | 8/2010 | Um | G02F 1/134336 349/141 |
| 2010/0225841 A1* | 9/2010 | Park et al. | 349/48 |
| 2011/0248216 A1* | 10/2011 | Klasen-Memmer | C09K 19/3001 252/299.62 |

OTHER PUBLICATIONS

Yanagisawa, et al., Transient Electric Current in p-Methoxybenzlidene-p-n-Butylaniline, Japanese Journal of Applied Physics, Jan. 1977, vol. 16, No. 1, pp. 45-48.

* cited by examiner

LIQUID CRYSTAL DISPLAY DEVICE

CROSS-REFERENCE TO RELATED APPLICATION

This application claims priority from and the benefit of Korean Patent Application No. 10-2014-0055576, filed on May 9, 2014, which is hereby incorporated by reference for all purposes as if fully set forth herein.

BACKGROUND

Field

Exemplary embodiments relate to a liquid crystal display device.

Discussion of the Background

In general, a liquid crystal display device includes a first substrate on which pixel electrodes are disposed, a second substrate on which a common electrode is disposed, and a liquid crystal layer interposed between the first and second substrates. The liquid crystal display device controls the transmittance of light through the liquid crystal layer, in accordance with an electric field formed between the pixel electrodes and the common electrode, thereby displaying a desired image. The liquid crystal display device includes pixels each including one pixel electrode.

In recent years, the liquid crystal display device has been developed to display not only a two-dimensional image but also a three-dimensional image. To this end, the pixels of the liquid crystal display device need a much faster response time.

The above information disclosed in this Background section is only for enhancement of understanding of the background of the inventive concept, and, therefore, it may contain information that does not constitute prior art.

SUMMARY

Exemplary embodiments provide a liquid crystal display device capable of being operated at a high temperature.

Additional aspects will be set forth in the detailed description which follows, and, in part, will be apparent from the disclosure, or may be learned by practice of the inventive concept.

Embodiments of the inventive concept provide a liquid crystal display device including a first substrate, a second substrate facing the first substrate, and a liquid crystal layer interposed between the first substrate and the second substrate. The liquid crystal layer includes liquid crystal molecules having a negative dielectric anisotropy and a response speed of about 4.0 ms or less, and the liquid crystal molecules have a rotational viscosity of about 47 mPa·S to about 75 mPa·S.

The liquid crystal display device has an improved response speed and a high voltage maintaining rate.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 1:
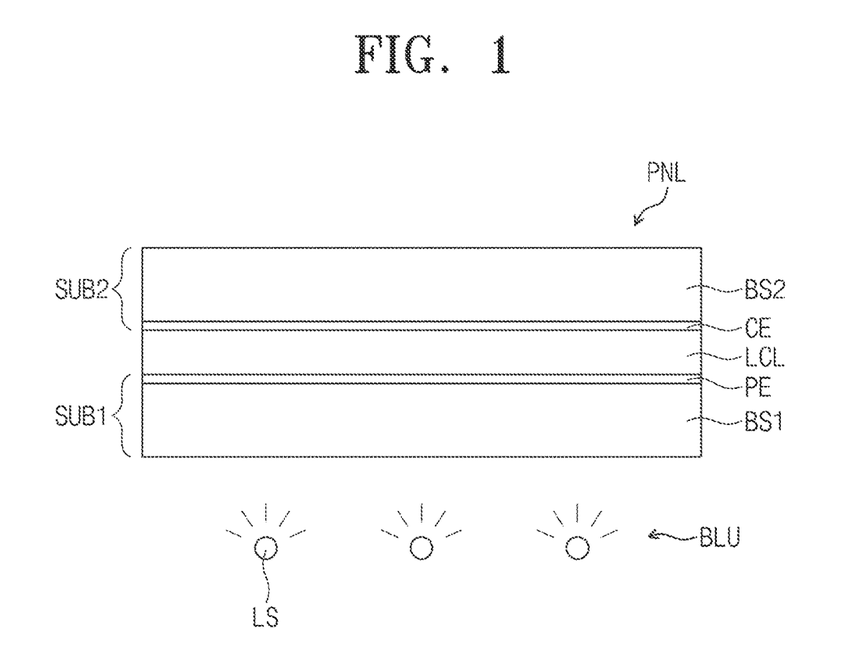
FIG. 1 is a cross-sectional view showing a liquid crystal display device according to an exemplary embodiment of the present disclosure.

FIG. 1 is a cross-sectional view showing a liquid crystal display device according to an exemplary embodiment of the present disclosure. Referring to FIG. 1, the liquid crystal display device includes a liquid crystal display panel PNL and a backlight unit BLU.

The backlight unit BLU is disposed under the liquid crystal display panel PNL to provide light to the liquid crystal display panel PNL. The backlight unit BLU includes light sources LS to emit the light. In FIG. 1, the light sources LS are disposed right under the liquid crystal display panel PNL. The number of the light sources LS should not be limited to the number shown in FIG. 1. According to another embodiment, for instance, a single light source LS may be provided. According to another embodiment, the light sources LS may be provided at one side of the liquid crystal display panel PNL. Various light sources, such as a point light source, a line light source, a surface light source, etc., may be used as the light source LS.

The liquid crystal display panel PNL displays an image. The liquid crystal display panel PNL has a rectangular plate shape with two pairs of sides meeting at right angles, and one of the two pairs of sides is longer than the other. In detail, the liquid crystal display panel PNL has the rectangular plate shape with a pair of long sides and a pair of short sides. The liquid crystal display panel PNL includes a first substrate SUB1, a second substrate SUB2 facing the first substrate SUB1, and a liquid crystal layer LCL interposed between the first substrate SUB1 and the second substrate SUB2.

The first substrate SUB1 includes a first base substrate BS1 and a pixel electrode PE disposed on the first base substrate SUB1. The second substrate SUB2 includes a second base substrate BS2 and a common electrode CE disposed on the second base substrate BS2. The pixel electrode PE and the common electrode CE apply an electric field to the liquid crystal layer LCL in response to voltages applied thereto. In the present exemplary embodiment, the electric field is formed in a direction substantially perpendicular to the first and second substrates SUB1 and SUB2, but is not limited thereto. According to another embodiment, the electric field may be formed in a direction substantially parallel to the first and second substrates SUB1 and SUB2.

Although not shown in FIG. 1, a first alignment layer and a second alignment layer are respectively disposed on the first and second substrates SUB1 and SUB2. The first and second alignment layers are used to pre-tilt liquid crystal molecules of the liquid crystal layer LCL and include an organic polymer and/or an inorganic polymer. For instance, the first and second alignment layers may include a photosensitive polymer. The photosensitive polymer includes a compound in which a dimerization, cis-trans isomerization, or light-decomposition reaction occurs when light is radiated thereto, and a directivity is given to the polymer in accordance with the irradiation direction or polarization direction of the light.

The liquid crystal molecules of the liquid crystal layer LCL have a negative dielectric anisotropy. The liquid crystal layer LCL has a nematic-isotropic transition temperature (Tni) of about 75° C.

The liquid crystal layer LCL includes about 25 parts by weight % to about 47 parts by weight % of a neutral liquid crystal, and about 52 parts by weight % to about 80 parts by weight % of a polar liquid crystal, based on the total weight of the liquid crystal layer LCL.

The neutral liquid crystal includes one or more kinds of liquid crystal molecules represented by the following chemical formula 1, and one or more kinds of liquid crystal molecules represented by the following chemical formula 2.

Chemical Formula 1

Chemical Formula 2

In chemical formulas 1 and 2, R and R' are each independently an alkyl or alkoxy group having 1 to 7 carbon atoms.

In the present exemplary embodiment, the neutral liquid crystal further includes one or more kinds of liquid crystal molecules represented by the following chemical formula 3.

Chemical Formula 3

In chemical formula 3, R and R' are each independently an alkyl or alkoxy group having 1 to 7 carbon atoms.

The polar liquid crystal includes one or more kinds of liquid crystal molecules represented by the following chemical formula 4, and one or more kinds of liquid crystal molecules represented by the following chemical formula 5.

Chemical formula 4

Chemical formula 5

In chemical formulas 4 and 5, R and R' are each independently an alkyl or alkoxy group having 1 to 7 carbon atoms.

In the present exemplary embodiment, the polar liquid crystal further includes one or more kinds of liquid crystal molecules represented by the following chemical formula 6, or one or more kinds of liquid crystal molecules represented by the following chemical formula 7.

Chemical Formula 6

Chemical Formula 7

In chemical formulas 6 and 7, R and R' are each independently an alkyl or alkoxy group having 1 to 7 carbon atoms.

In the liquid crystal display device according to the present exemplary embodiment, when a rotational viscosity of the liquid crystal molecules of the liquid crystal layer LCL increases, a response speed of the liquid crystal molecules becomes faster. A time period in which the liquid crystal molecules are transformed by the electric field is referred to as a rising time, and a time period in which the transformed liquid crystal molecules return to their original position is referred to as a falling time (Toff). The falling time and the rotational viscosity satisfy the following equation 1.

$$Toff \propto \frac{\gamma_1 d^2}{K_{33}}$$

Equation 1

In equation 1, "$\gamma_1$" denotes the rotational viscosity of the liquid crystal molecules, "d" denotes a distance between the first substrate and the second substrate, i.e., a cell gap, and "$K_{33}$" denotes a bending elastic coefficient.

Table 1 below shows a composition ratio of the liquid crystal layer in the liquid crystal display device according to exemplary embodiments of the present disclosure, and Table 2 below shows the rotational viscosity as a function of a drive temperature according to exemplary embodiments of the present disclosure.

In Table 1, a liquid crystal display device according to a first exemplary embodiment includes a liquid crystal having a nematic-isotropic transition temperature of about 75° C. A liquid crystal display device according to a second exemplary embodiment includes a liquid crystal having a nematic-isotropic transition temperature of about 110° C. The liquid crystal display devices according to the first and second exemplary embodiments are manufactured under the same conditions, except for the composition ratio of the liquid crystal molecules.

TABLE 1

| Polar | Chemical formula | First embodiment (weight %) | Second embodiment (weight %) |
|---|---|---|---|
| Neutral | | 5 to 10 | 7 to 13 |
| liquid crystal | | 20 to 25 | 23 to 29 |
| | | — | 1 to 5 |
| Polar liquid crystal | | 30 to 35 | 39 to 47 |

TABLE 1-continued

| Polar | Chemical formula | First embodiment (weight %) | Second embodiment (weight %) |
|---|---|---|---|
| |  | 5 to 10 | 10 to 16 |
| |  | 25 to 35 | — |
| |  | — | 3 to 9 |

In each of the liquid crystal molecules, R and R' are independently selected from alkyl and alkoxy groups, each having 1 to 7 carbon atoms.

TABLE 2

| | Rotational viscosity (mPa · S) | |
|---|---|---|
| Drive temperature | First embodiment | Second embodiment |
| 20° C. | 115 | 190 |
| 30° C. | 71 | 115 |
| 40° C. | 47 | 75 |
| 50° C. | 32 | 52 |

As shown in Table 2, the drive temperature is inversely proportional to the rotational viscosity, and thus, the rotational viscosity is decreased when the drive temperature is increased. Since the falling time is decreased when the rotational viscosity is decreased, the response speed of the liquid crystal display device becomes faster.

However, when the rotational viscosity is larger than about 75 mPa·S, the falling time becomes greater than a reference time, e.g., about 4.0 ms, at which a user perceives an afterimage. Accordingly, the response speed of the liquid crystal display device becomes slower. On the contrary, when the rotational viscosity is smaller than about 47 mPa·S, the mobility of impurities, e.g., ions, existing in the liquid crystal molecules increases. Thus, a defect may occur, such as reduction in a voltage maintaining rate. Therefore, the rotational viscosity of the liquid crystal layer in the present exemplary embodiment is in a range of about 47 mPa·S to about 75 mPa·S. According to some embodiments, the liquid crystal layer has the rotational viscosity of about 52 mPa·S to about 75 mPa·S.

The following Table 3 shows the falling time (Toff) as a function of the drive temperature. In Table 3, the falling time (Toff) is set to 100% in the case that the falling time is about 4.0 ms during the turn-off of the pixel electrode, when the liquid crystal molecules of each of the first and second embodiments are driven by the electric field formed by the pixel electrode and the common electrode. Each value represented in Table 3 indicates a relative value of the falling time when the drive temperature varies in each of the first and second embodiments.

TABLE 3

| | Falling time (Toff) | |
|---|---|---|
| Drive temperature | First embodiment | Second embodiment |
| 20° C. | 146.0 | 187.7 |
| 30° C. | 100.0 | 122.5 |
| 40° C. | 75.0 | 85.6 |
| 50° C. | 60.3 | 64.8 |

To display the image from which the afterimage is removed, the liquid crystal display device needs to have a driving speed of about 4.2 ms or less. According to Table 3, the liquid crystal display device according to the first embodiment has a driving speed exceeding about 4.0 ms when the driving temperature is about 20° C., and has a driving speed less than about 4.0 ms when the driving temperature is higher than about 30° C. The liquid crystal display device according to the second embodiment has a driving speed exceeding about 4.0 ms when the driving temperature is about 20° C. and about 30° C., and has a driving speed less than about 4.0 ms when the driving temperature is higher than about 40° C.

Accordingly, the liquid crystal molecules of the liquid crystal layer are driven at the driving temperature of about 40° C. or more, when the nematic-isotropic transition temperature is about 110° C. or more. The liquid crystal molecules of the liquid crystal layer are driven at a driving temperature of about 30° C. or more, when the nematic-isotropic transition temperature is about 75° C. or more. In this case, the liquid crystal display device has a driving speed of about 4.0 ms or less.

Tables 4 and 5 show the voltage maintaining rate as a function of the driving temperate in the first and second embodiments. The voltage maintaining rate shown in Table 4 is measured at an applied voltage of about 0.1 volts and about 60 Hz, between the pixel electrode and the common electrode. The voltage maintaining rate shown in Table 5 is measured at an applied voltage of about 0.1 volts and about 3 Hz, between the pixel electrode and the common electrode.

TABLE 4

| Drive temperature | Voltage maintaining rate (%) | |
| --- | --- | --- |
| | First embodiment | Second embodiment |
| 30° C. | 99.7 | 99.8 |
| 40° C. | 99.7 | 99.8 |
| 45° C. | 99.7 | 99.8 |
| 50° C. | 99.4 | 99.7 |

TABLE 5

| Drive temperature | Voltage maintaining rate (%) | |
| --- | --- | --- |
| | First embodiment | Second embodiment |
| 20° C. | 98.7 | 99.4 |
| 30° C. | 98.2 | 99.3 |
| 40° C. | 97.4 | 98.9 |
| 50° C. | 96.1 | 98.5 |

In the present exemplary embodiments, the voltage maintaining rate required to stably drive the image is about 97% or more. As shown in Table 4, the voltage maintaining rate is about 97% or more in the first and second embodiments. However, as shown in Table 5, the voltage maintaining rate is about 96% when the drive temperature is about 50° C., in the first embodiment.

Accordingly, the liquid crystal display device according to the first embodiment may be operated at a drive temperature equal to or less than about 50° C. The liquid crystal display device according to the second embodiment may be operated at the drive temperature of less than about 50° C.

The liquid crystal display devices having the above-mentioned configuration may have fast response speeds and high voltage maintaining rates.

In the present exemplary embodiments, the liquid crystal layer LCL may be operated in a vertical alignment mode, and in this case, the liquid crystal molecules of the liquid crystal layer LCL may be liquid crystal molecules having negative dielectric anisotropy. When the liquid crystal molecules of the liquid crystal layer LCL have negative dielectric anisotropy, the liquid crystal molecules are aligned in a direction substantially perpendicular to surfaces of the first and second substrates SUB1 and SUB2, when no electric field is applied to the liquid crystal molecules, and are aligned in a direction substantially in parallel to the surfaces of the first and second substrates SUB1 and SUB2 when an electric field is applied to the liquid crystal molecules.

Figure 2:
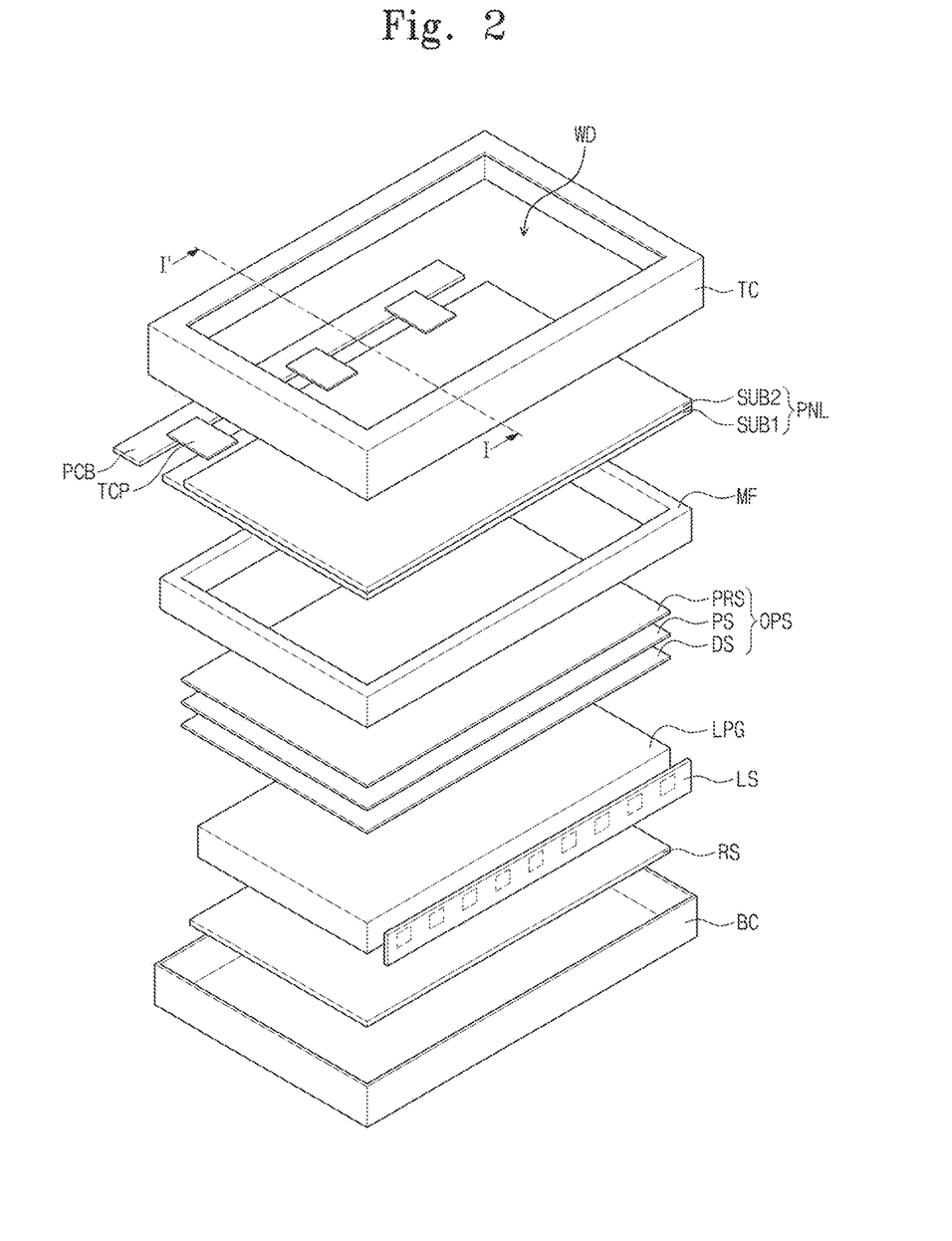
FIG. 2 is an exploded perspective view showing the liquid crystal display device according to an exemplary embodiment of the present disclosure.
Figure 3:
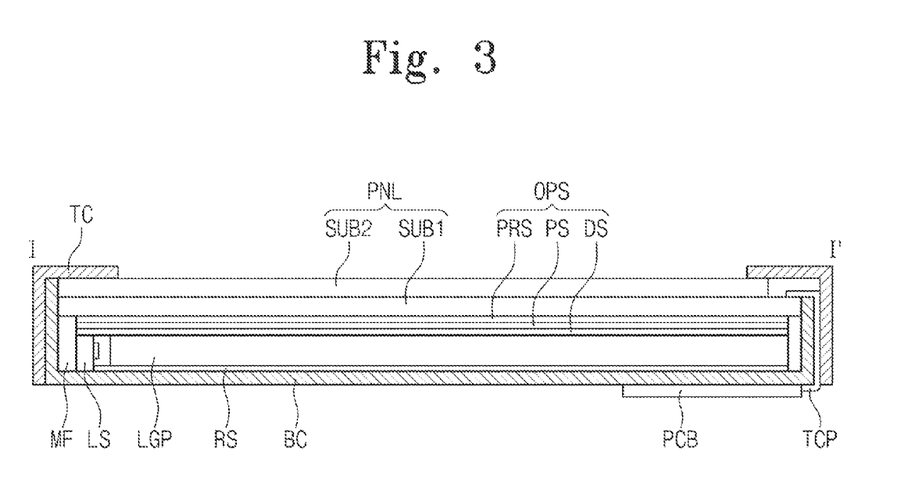
FIG. 3 is a cross-sectional view taken along a line I-I' shown in FIG. 2.

According to various embodiments, provided is a liquid crystal display device that may include the vertical alignment liquid crystal molecules. FIG. 2 is an exploded perspective view showing the liquid crystal display device operated with the vertical alignment mode, and FIG. 3 is a cross-sectional view taken along a line I-I' shown in FIG. 2. Referring to FIGS. 2 and 3, the liquid crystal display device includes the liquid crystal display panel PNL and the backlight unit.

The liquid crystal display panel PNL displays an image. The liquid crystal display panel PNL includes the first substrate SUB1, the second substrate SUB2 facing the first substrate SUB1, and the liquid crystal layer (not shown) interposed between the first substrate SUB1 and the second substrate SUB2. The first substrate SUB1 has an area larger than that of the second substrate SUB2, and thus, one side of the first substrate SUB1 is not overlapped with the second substrate SUB2.

According to the present exemplary embodiment, the first substrate SUB1 includes pixel electrodes (not shown) and thin film transistors (not shown) electrically connected to the pixel electrodes in a one-to-one correspondence. Each thin film transistor switches a driving signal applied to a corresponding pixel electrode of the pixel electrodes. The second substrate SUB2 includes the common electrode (not shown) that forms the electric field in cooperation with the pixel electrodes, to control the alignment of the liquid crystal molecules of the liquid crystal layer. The liquid crystal display panel PNL drives the liquid crystal molecules of the liquid crystal layer to display the image in a front direction.

The liquid crystal display panel PNL includes a tape carrier package TCP and a printed circuit board PCB electrically connected to the liquid crystal display panel PNL through the tape carrier package TCP. A driving circuit, e.g., a drive IC, is mounted on the tape carrier package TCP.

The tape carrier package TCP is attached to the end of the first substrate SUB1 that is not covered by the second substrate SUB2. For the convenience of explanation, the printed circuit board PCB is disposed at the same plane as the liquid crystal display panel PNL in FIG. 2. However, the printed circuit board PCB is substantially disposed on an outer surface of a bottom chassis BC, as shown in FIG. 3. In this case, the tape carrier package TCP is bent along the outer surface of the bottom chassis BC. Thus, the liquid crystal display panel PNL is connected to the printed circuit board PCB.

The backlight unit provides the light to the liquid crystal display panel PNL. The backlight unit includes a mold frame MF to support the liquid crystal display panel PNL, the light source LS to emit the light, a light guide plate LGP to guide the light, optical sheets OPS disposed on the light guide plate LGP, a reflection sheet RS disposed under the light guide plate LGP, and the bottom chassis BC disposed under the reflection sheet RS.

The mold frame MF is provided along the edges of the liquid crystal display panel PNL to support the liquid crystal display panel PNL. The mold frame MF may include a fixing member, e.g., a catching jaw, to fix or support the light source LS and the optical sheets OPS. The mold frame MF is provided to correspond to four sides of the display panel DP or at least a portion of the four sides. For instance, the mold frame MF has a rectangular shape to correspond to the four sides of the display panel DP, or may have a U shape to correspond to three sides of the display panel DP. The mold frame MF may be integrally formed as a single unit or may formed in plural parts to be assembled to each other at a later stage. The mold frame MF includes an organic material, e.g., polymer resin, but is not limited thereto.

The light source LS may be a point light source, a line light source, or a surface light source, but is limited thereto. The light guide plate LGP is disposed under the liquid crystal display panel PNL to guide the light emitted from the light source LS to the liquid crystal display panel PNL.

The optical sheets OPS are disposed between the light guide plate LGP and the liquid crystal display panel PNL. The optical sheets OPS control the properties of light exiting the light guide plate LGP. The optical sheets OPS include a diffusion sheet DS, a prism sheet PS, and a protection sheet PRS, which are sequentially stacked on the light guide plate LGP.

The reflection sheet RS is disposed under the light guide plate LGP to reflect the light leaked from the light guide plate LGP, without being directed to the liquid crystal display panel PNL, towards the liquid crystal display panel PNL.

A top chassis TC is disposed on the liquid crystal display panel PNL. The top chassis TC supports the front of the liquid crystal display panel PNL and covers a side portion of the mold frame MF, or a side portion of the bottom chassis BC. The top chassis TC includes a display window WD to expose an area of the liquid crystal display panel PNL.

The bottom chassis BC is disposed under the reflection sheet RS to accommodate the liquid crystal display panel PNL, the mold frame MF, the light source LS, the light guide plate LGP, the optical sheets OPS, and the reflection sheet RS.

Figure 4:
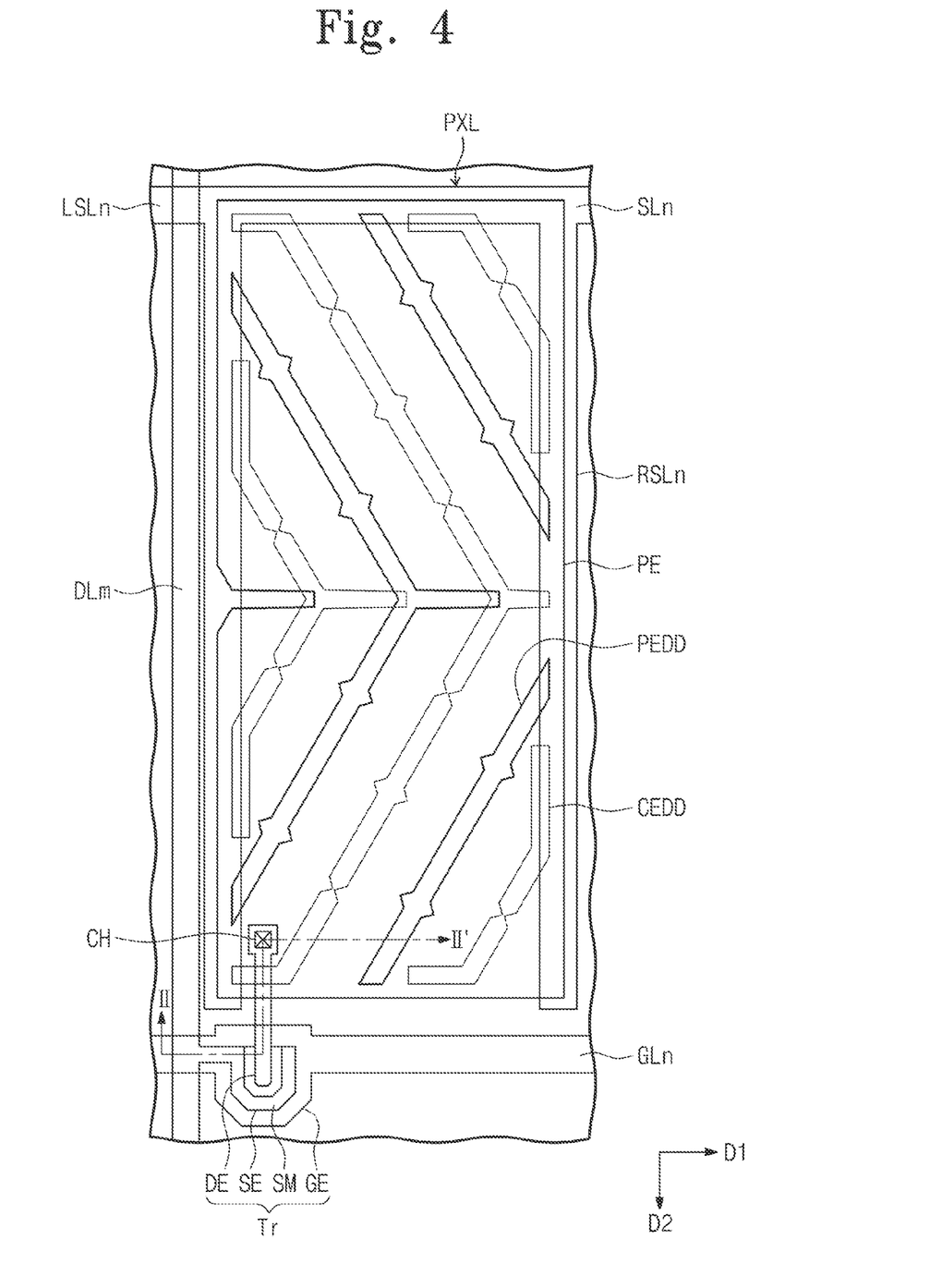
FIG. 4 is a plan view showing a liquid crystal display panel according to an exemplary embodiment of the present disclosure.
Figure 5:
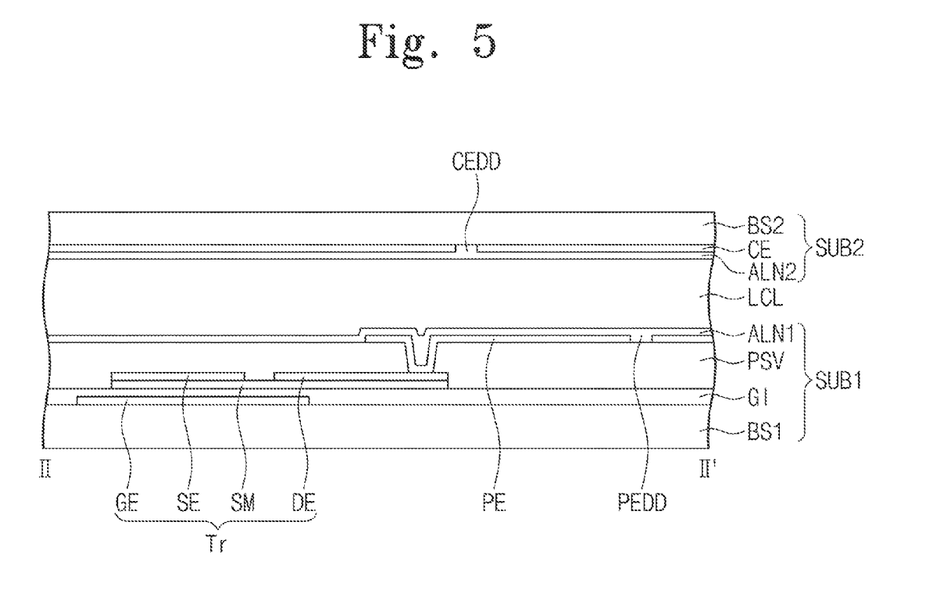
FIG. 5 is a cross-sectional view taken along a line II-II' shown in FIG. 5.

FIG. 4 is a plan view showing a pixel of the liquid crystal display panel, according to an exemplary embodiment of the present disclosure, and FIG. 5 is a cross-sectional view taken along a line II-II' shown in FIG. 4. Referring to FIGS. 4 and 5, the liquid crystal display device includes a first substrate SUB1, a second substrate SUB2 facing the first substrate SUB1, and a liquid crystal layer LCL interposed between the first substrate SUB1 and the second substrate SUB2.

The first substrate SUB1 includes a first base substrate BS1, gate lines, data lines, a plurality of pixels, and a first alignment layer ALN1.

The first substrate SUB1 includes pixel areas arranged in a matrix, and the pixels are arranged in the pixel areas in a one-to-one correspondence. For the convenience of explanation, FIG. 5 shows one pixel PXL, an n-th gate line GLn of the gate lines, and an m-th data line DLm of the data lines, which are arranged in one pixel area, since the pixel areas have the same structure. Hereinafter, the n-th gate line GLn and the m-th data line DLm will be referred to as a gate line and a data line.

The gate line GLn is disposed on the first base substrate BS1 and extends in a first direction D1. The data line DLm is disposed on the gate line GLn, such that a gate insulating layer GI is disposed between the gate line GLn and the data line DLm. The data line DLm extends in a second direction D2 crossing the first direction D1. The gate insulating layer GI is disposed over the entire surface of the first base substrate BS1 to cover the gate line GLn.

The pixel PXL is connected to a corresponding gate line GLn of the gate lines and a corresponding data line DLm of the data lines. The pixel PXL includes a thin film transistor Tr, a pixel electrode PE connected to the thin film transistor Tr, and a storage electrode part.

The thin film transistor Tr includes a gate electrode GE, a semiconductor layer SM, a source electrode SE, and a drain electrode DE.

The gate electrode GE is protruded from the gate line GLn or disposed on a portion of the gate line GLn.

The gate line GLn and the gate electrode GE are formed of a metal material. The gate line GLn and the gate electrode GE may include nickel, chromium, molybdenum, aluminum, titanium, copper, tungsten, or an alloy thereof. The gate line GLn and the gate electrode GE may have a single-layer structure or a multi-layer structure of the above-mentioned metal materials. For instance, the gate line GLn and the gate electrode GE have a triple-layer structure of molybdenum, aluminum, and molybdenum, which are sequentially stacked on one another, a double-layer structure of titanium and copper sequentially stacked, or a single-layer structure of an alloy of titanium and copper.

The gate insulating layer GI is disposed over the first base substrate BS1 to cover the gate electrode GE. The semiconductor layer SM is provided on the gate insulating layer GI. The semiconductor layer SM is disposed on the gate electrode GE, such that the gate insulating layer GI is disposed between the semiconductor layer SM and the gate electrode.

The semiconductor layer SM includes an active pattern (not shown) disposed on the gate insulating layer GI and an ohmic contact layer (not shown) disposed on the active pattern. The active pattern includes an amorphous silicon thin film layer, and the ohmic contact layer includes n+ amorphous silicon thin film layer. The ohmic contact layer allows the active pattern to be in ohmic contact with the source electrode SE and the drain electrode DE.

The source electrode SE is branched from the data line DLm. The source electrode SE is disposed on the ohmic contact layer and a portion of the source electrode SE is overlapped with the gate electrode GE.

The drain electrode DE is spaced apart from the source electrode SE, such that the semiconductor layer SM is disposed between the drain and source electrodes DE and SE. The drain electrode DE is disposed on the ohmic contact layer and a portion of the drain electrode DE is overlapped with the gate electrode GE.

The source electrode SE and the drain electrode DE may be formed of a conductive material, e.g., a metal material, such as nickel, chromium, molybdenum, aluminum, titanium, copper, tungsten, or an alloy thereof. Each of the source electrode SE and the drain electrode DE may have a single-layer structure or a multi-layer structure. For example, each of the source and drain electrodes SE and DE may have a double-layer structure of titanium and copper sequentially stacked one on another, or a single-layer structure of an alloy of titanium and copper.

An upper surface of the active pattern is exposed between the source electrode SE and the drain electrode, and a channel portion is formed between the source electrode SE and the drain electrode DE as a conductive channel according to the application of the voltage to the gate electrode GE. The source electrode SE and the drain electrode DE are overlapped with the portion of the semiconductor layer SM, except for where the channel portion is formed.

The storage electrode part includes a storage line SLn extending in the first direction D1 and first and second branch electrodes LSLn and RSLn branched from the storage line SLn and extending in the second direction D2.

The pixel electrode PE is connected to the drain electrode DE through a contact hole CH formed through a passivation layer PSV disposed between the pixel electrode PE and the drain electrode DE. The pixel electrode PE is partially overlapped with the storage line SLn and the first and second branch electrodes LSLn and RSLn, to form a storage capacitor.

The passivation layer PSV covers the source electrode SE, the drain electrode DE, the channel portion, and the gate insulating layer GI. The passivation layer PSV includes the contact hole CH exposing a portion of the drain electrode DE. The passivation layer PSV includes silicon nitride or silicon oxide. The pixel electrode PE is connected to the drain electrode DE through the contact hole CH formed through the passivation layer PSV.

The pixel electrode PE includes a first domain divider PEDD to divide the pixel PXL into plural domains. The first domain divider PEDD may be a cut-away portion formed by patterning the pixel electrode PE or a protrusion thereof. The cut-away portion may be an opening formed by removing a portion of the pixel electrode PE or may be a slit formed therein. The first domain divider PEDD includes a horizontal portion and/or a vertical portion, which extend(s) in the first direction D1 or the second direction D2, to divide the pixel PXL into two parts in a longitudinal direction. The first domain divider PEDD includes oblique line portions inclined with respect to the first and second directions D1 and D2. An oblique line portion disposed at one side of the horizontal portion is substantially linearly symmetrical with an oblique line portion disposed at the other side of the horizontal portion, with respect to the horizontal portion.

The pixel electrode PE includes a transparent conductive material. In particular, the pixel electrode PE includes a transparent conductive oxide, e.g., indium tin oxide, indium zinc oxide, indium tin zinc oxide, etc.

The first alignment layer ALN1 is disposed on the pixel electrode PE to align the liquid crystal molecules of the liquid crystal layer LCL. The second substrate SUB2 includes a second base substrate BS2, a common electrode CE, and a second alignment layer ALN2.

The common electrode CE is disposed on the second base substrate BS2 and forms the electric field in cooperation with the pixel electrode PE, to drive the liquid crystal molecules of the liquid crystal layer LCL. The common electrode CE includes a transparent conductive material. In detail, the common electrode CE includes a transparent metal oxide, e.g., indium tin oxide, indium zinc oxide, indium tin zinc oxide, etc.

The common electrode CE includes a second domain divider CEDD to divide the pixel PXL into plural domains. The second domain divider CEDD may be a cut-away portion formed by patterning the common electrode CE or may be a protrusion. The cut-away portion may be an opening formed by partially removing a portion of the common electrode CE. The second domain divider CEDD includes a horizontal portion and/or a vertical portion, which extend(s) in the first direction D1 or the second direction D2 to divide the pixel PXL into two parts in the longitudinal direction. The second domain divider CEDD includes oblique line portions inclined with respect to the first and second directions D1 and D2. An oblique line portion disposed at one side of the horizontal portion is substantially linearly symmetrical with an oblique line portion disposed at the other side of the horizontal portion, with respect to the horizontal portion.

The horizontal portion of the first domain divider PEDD and the horizontal portion of the second domain divider CEDD may be disposed at the same position. The oblique line portion of the first domain divider PEDD and the oblique line portion of the second domain divider CEDD may be arranged substantially in parallel to each other. In addition, the oblique line portion of the first domain divider PEDD and the oblique line portion of the second domain divider CEDD may be alternately arranged with each other.

The second alignment layer ALN is disposed on the common electrode CE to align the liquid crystal molecules of the liquid crystal layer LCL. The liquid crystal layer LCL including the liquid crystal molecules is disposed between the first substrate SUB1 and the second substrate SUB2.

When a gate signal is applied to the gate line GLn, the thin film transistor Tr is turned on. Therefore, a data signal applied to the data line DLm is applied to the pixel electrode PE through the turned-on thin film transistor Tr. When the data signal is applied to the pixel electrode PE through the thin film transistor Tr, the electric field is formed between the pixel electrode PE and the common electrode CE. The liquid crystal molecules are driven in response to the electric field formed by a difference in voltage between the voltage applied to the pixel electrode PE and the voltage applied to the common electrode CE. Thus, the amount of the light passing through the liquid crystal layer LCL is changed, so that a desired image is displayed through the liquid crystal display device.

In the present exemplary embodiment, the vertical alignment mode liquid crystal display device including the above-mentioned domain dividers has been described as the liquid crystal display device, but the liquid crystal display device is not limited to the vertical alignment mode liquid crystal display device including the above-mentioned domain dividers. That is, the liquid crystal display device according to the present disclosure may be a vertical alignment liquid crystal display device including an electrode through which the slit is formed or a vertical alignment liquid crystal display device including an electrode through which a plurality of micro-slits is formed, which are substantially in parallel to each other.

Although exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:
1. A liquid crystal display device, comprising:
a first substrate;
an opposing second substrate; and
a liquid crystal layer interposed between the first substrate and the second substrate, the liquid crystal layer comprising:
  liquid crystal molecules represented by Chemical Formula 1 in an amount of 7% by weight to 13% by weight of the liquid crystal layer;
  liquid crystal molecules represented by Chemical Formula 2 in an amount of 23% by weight to 29% by weight of the liquid crystal layer;
  liquid crystal molecules represented by Chemical Formula 3 in an amount of 1% by weight to 5% by weight of the liquid crystal layer;
  liquid crystal molecules represented by Chemical Formula 4 in an amount of 39% by weight to 47% by weight of the liquid crystal layer;
  liquid crystal molecules represented by Chemical Formula 5 in an amount of 10% by weight to 16% by weight of the liquid crystal layer;
  liquid crystal molecules represented by Chemical Formula 7 in an amount of 3% by weight to 9% by weight of the liquid crystal layer;
wherein the liquid crystal layer has a nematic isotropic transition temperature of 110° C. or more,
wherein the liquid crystal layer is configured to operate at a temperature of 40° C.±10%,
wherein the liquid crystal layer has a rotational viscosity of 52 mPa·S to 75 mPa·S and comprises liquid crystal molecules having a negative dielectric anisotropy,
wherein the liquid crystal display device is configured to have a response speed of 4.0 ms or less, and
wherein Chemical Formulas 1, 2, 3, 4, 5, and 7 are as follows:

(Chemical Formula 1)

(Chemical Formula 2)

-continued (Chemical Formula 3)

(Chemical Formula 4)

(Chemical Formula 5)

(Chemical Formula 7)

wherein the liquid crystal layer excludes liquid crystal molecules represented by Chemical Formula 6, which is as follows:

Chemical formula 6 wherein, in Chemical Formulas 1, 2, 3, 4, 5, 6, and 7, R and R' are each independently an alkyl or an alkoxy group having 1 to 7 carbons.

2. The liquid crystal display device of claim 1, wherein the liquid crystal layer is configured to operate in a vertical alignment mode.

3. The liquid crystal display device of claim 2, wherein: the first substrate comprises a first base substrate and a first electrode disposed on the first base substrate; and the second substrate comprises a second base substrate and a second electrode disposed on the second base substrate to form an electric field in cooperation with the first electrode.

4. The liquid crystal display device of claim 3, wherein: the first electrode comprises a first domain divider to divide the first electrode into domains; and the second electrode comprises a second domain divider to divide the second electrode into domains.

5. The liquid crystal display device of claim 4, wherein a portion of the first domain divider is alternately arranged with a portion of the second domain divider, when viewed in a plan view.

6. The liquid crystal display device of claim 4, wherein each of the first and second domain dividers is a cut-away portion or a protrusion.

7. The liquid crystal display device of claim 4, wherein each of the first and second domain dividers comprises a horizontal portion extending in one direction and an oblique line portion inclined with respect to the horizontal portion.

8. The liquid crystal display device of claim 1, wherein the liquid crystal layer is configured to operate at a temperature of 40° C.±5%.

9. A liquid crystal display device, comprising:
a first substrate;
an opposing second substrate; and
a liquid crystal layer interposed between the first substrate and the second substrate, the liquid crystal layer consisting of:
liquid crystal molecules represented by Chemical Formula 1 in an amount of 7% by weight to 13% by weight of the liquid crystal layer;
liquid crystal molecules represented by Chemical Formula 2 in an amount of 23% by weight to 29% by weight of the liquid crystal layer;
liquid crystal molecules represented by Chemical Formula 3 in an amount of 1% by weight to 5% by weight of the liquid crystal layer;
liquid crystal molecules represented by Chemical Formula 4 in an amount of 39% by weight to 47% by weight of the liquid crystal layer;
liquid crystal molecules represented by Chemical Formula 5 in an amount of 10% by weight to 16% by weight of the liquid crystal layer;
liquid crystal molecules represented by Chemical Formula 7 in an amount of 3% by weight to 9% by weight of the liquid crystal layer;
wherein the liquid crystal layer has a nematic isotropic transition temperature of 110° C. or more,
wherein the liquid crystal layer is configured to operate at a temperature of 40° C.±10%,
wherein the liquid crystal layer has a rotational viscosity of 52 mPa·S to 75 mPa·S and comprises liquid crystal molecules having a negative dielectric anisotropy,
wherein the liquid crystal display device is configured to have a response speed of 4.0 ms or less, and
wherein Chemical Formulas 1, 2, 3, 4, 5, and 7 are as follows:

(Chemical Formula 1)

(Chemical Formula 2)

(Chemical Formula 3)

(Chemical Formula 4)

(Chemical Formula 5)

(Chemical Formula 7)

wherein, in Chemical Formulas 1, 2, 3, 4, 5, and 7, R and R' are each independently an alkyl or an alkoxy group having 1 to 7 carbons.

* * * * *